Patented June 16, 1925.

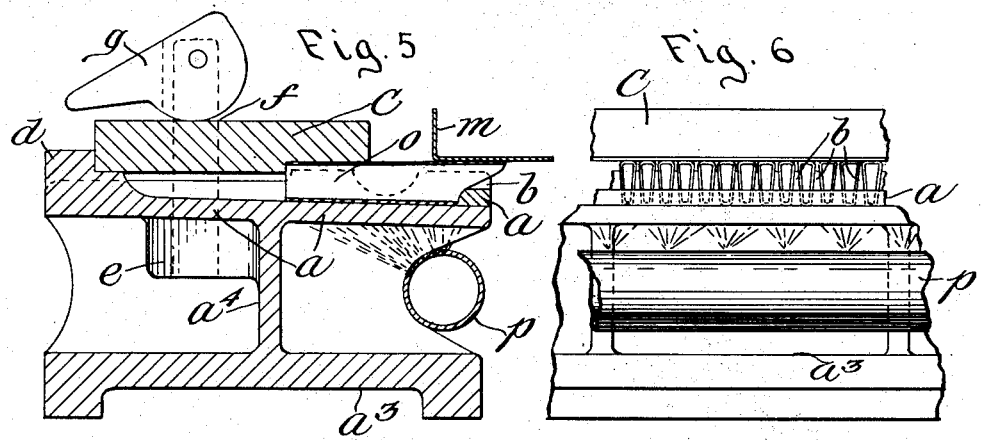
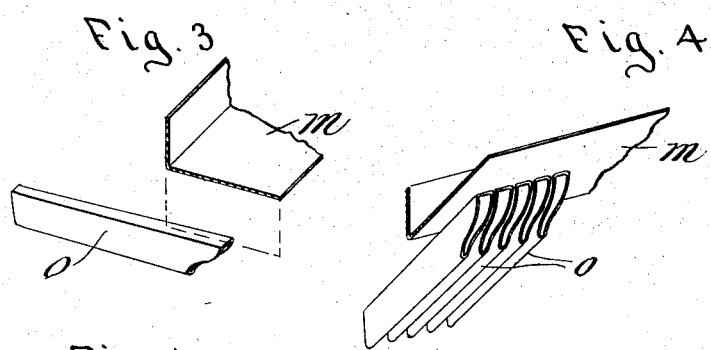
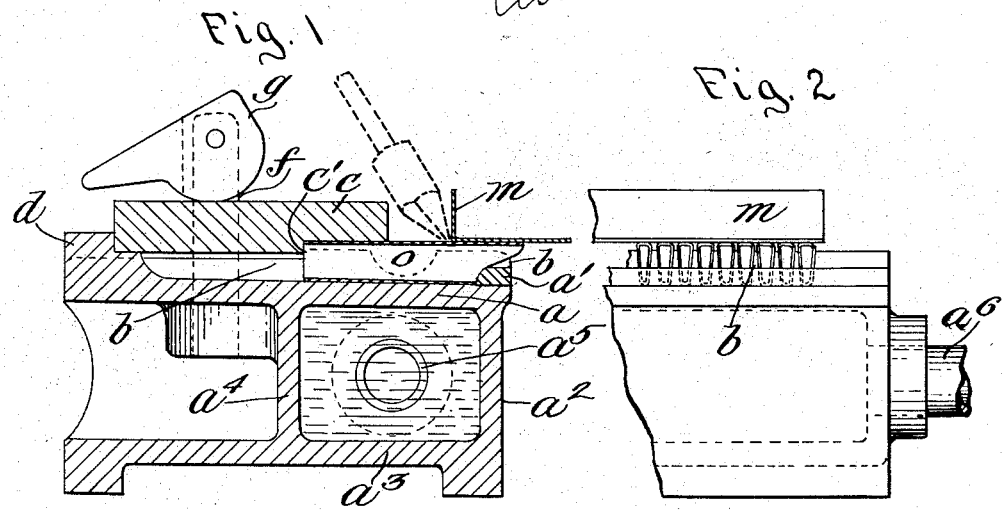

1,542,805

UNITED STATES PATENT OFFICE.

EDGAR F. HATHAWAY, OF WELLESLEY, MASSACHUSETTS, ASSIGNOR TO SHAWMUT ENGINEERING COMPANY, OF BOSTON, MASSACHUSETTS, A CORPORATION OF MASSACHUSETTS.

ART OF ASSEMBLING TUBE FRAMES FOR LOOMS.

Application filed March 18, 1922. Serial No. 544,896.

*To all whom it may concern:*

Be it known that I, EDGAR F. HATHAWAY, a citizen of the United States, and resident of Wellesley, in the county of Norfolk and State of Massachusetts, have invented certain new and useful Improvements in the Art of Assembling Tube Frames for Looms, of which the following is a specification.

This invention relates to the art of assembling tube frames for weaving carpets or other pile fabric, and is intended to provide a method and a means for assembling individual tuft tubes on the longitudinal carrier strip in such a way as to insure the accurate, reliable and uniform spacing of the individual tubes in the completed structure.

In cases where the individual tubes are soldered to a metallic strip forming part of the longitudinal carrier bar which has been a common method of constructing tube frames heretofore, it is often found, particularly in the case of very long tube frames for extra wide carpets, that the individual tubes are not accurately spaced even though a spacing member or matrix be used to position them for the assembling operation. Now as the individual tubes have to pass between the individual warp elements of the fabric in the weaving operation, it will be seen that the accurate or irregular spacing of the tuft tubes is likely to cause serious difficulties in weaving the fabric.

After careful study of this difficulty I have found that the cause for such irregular or incorrect spacing of the tuft tubes on the carrier strip is that the matrix or spacing member used to hold the tuft tubes in position becomes gradually warm and then hot under the repeated soldering operations, and to a sufficient degree to cause enough expansion to materially affect the spaced relationship of the individual tubes that are being held by the matrix or spacing member for the soldering operation, and my present invention consists essentially of providing means for abstracting the heat from a suitable spacing or tube-holding member by means of a cooling fluid stream to prevent expansion and keep the tubes uniformly spaced during the process of soldering the tubes to the back-strip by which they are attached to the carrier bar or member of the tube frame.

In the accompanying drawings I have illustrated different arrangements of apparatus for maintaining a constant spacing of the tubes during the soldering operation in which:

Figure 1 is an elevation in cross section of a complete tube spacing device for holding the tubes in correct position to be soldered to the back-strip, provision being made for a water-cooling circulation.

Figure 2 is a partial front elevation of the device shown in Figure 1.

Figure 3 is a perspective view showing the individual tube and the longitudinal back-strip separated somewhat from their normal assembled relationship.

Figure 4 shows a portion of the longitudinal backing strip with a plurality of tuft tubes soldered thereto.

Figure 5 is a vertical elevation of a tube spacing and holding device provided with an air cooling conduit.

Figure 6 is a front elevation of the construction illustrated in Figure 5.

In the practice of my invention according to the forms illustrated in Figures 1 and 2, of the drawings, I employ a tube-holding and spacing apparatus comprising a bed plate or matrix $a$ of sufficient length to support a row of parallel tuft tubes $o$ in properly spaced relationship, the individual tuft tube $o$ being set into transverse grooves or channels formed between the parallel cross ribs $b$ on the top of the bed plate $a$, and being pressed firmly against said bed plate by the upper clamping plate $c$ whose forward lower corner is rabbeted or recessed as shown at $c'$ to receive the projecting or forward ends of the individual tubes. This clamping plate $c$ is seated in a rabbeted recess formed in the longitudinal boss or rib $d$ and clamped in position by one or more eccentric levers $g$ mounted in standards $f$ so as to engage and press the clamping plate $c$ into firm engagement with the individual tubes in their spaced relations as they lie in the transverse slots between the cross ribs $b$ of the bed plate.

Beneath that portion of the bed plate which supports the row of parallel tuft tubes $o$ is formed a cooling chamber which, in the form shown in Figures 1 and 2, comprises a chamber whose front and rear sides and bottom are closed by the walls $a^2$, $a^4$ and $a^3$ to form a water-circulating chamber having an inlet $a^5$ at one end and an outlet $a^6$ at the other for suitably maintaining a circulation of liquid to conduct away the heat from the bed plate. As the circulation can be regulated sufficiently to carry away the surplus heat, the temperature of the bed plate is maintained at a substantially uniform temperature so that the proper spacing of the individual tuft tubes is not disturbed.

A retaining bar or lug $a'$ extending longitudinally along the front edge of the bed plate serves to prevent any forward displacement of the individual tuft tubes. The longitudinal metal strip $m$ to which the individual tubes are soldered, as shown in Figure 1, is placed so as to overlap for a short distance the intake ends of the tuft tubes while the soldering point is applied as indicated in Figure 1 to solder the tubes successively to the back-strip which is afterwards attached to the carrier bar in any suitable manner.

In Figures 5 and 6 I have shown a cooling chamber or recess without any front wall, and running longitudinally beneath the bed plate $a$ is a spray pipe $p$ consisting of a tube having fine perforations arranged on the side toward the bottom of the bed plate so as to allow the cold air or other medium used for cooling to be sprayed against the bottom of the bed plate to prevent any substantial rise in temperature and consequent expansion thereof. In other respects the device shown in Figures 5 and 6 is similar to that shown in Figures 1 and 2. Of course, any convenient or suitable cooling medium may be used in this apparatus, and the form thereof may be modified to suit convenience or local conditions.

I believe that I am the first to secure accurate, regular and uniform spacing of the tuft tubes soldered on a back strip by subjecting the holding and spacing device to the action of a cooling medium to prevent expansion during the soldering operation, and that I am also the first to provide a holding device for this purpose with means for abstracting the heat therefrom during the soldering operation.

What I claim is:

1. The improvement in the art of assembling tube frames which consists in locating the individual tuft tubes in parallelism transversely of a longitudinal metallic holding strip by the aid of a spacing member, soldering the tubes to said strip and simultaneously cooling the spacing member to prevent the applied heat of soldering from expanding the spacing member in order to maintain the tubes in a uniform spaced relation during the assembling operation, substantially as described.

2. The improvement in the art of assembling tuft tubes in a tube frame which consists in arranging a series of individual tubes in parallelism by means of a spacing and holding device, affixing the tubes while so held to a longitudinal strip with the aid of heat and abstracting excess of heat from the spacing and holding device by means of a cooling medium brought into contact therewith, substantially as described.

3. A device for assembling tuft tubes for a tube frame embracing in its construction a tube supporting and spacing member for retaining the individual tubes in parallel spaced relation for contact with a longitudinal backing strip, and a conduit extending lengthwise of the holding member to conduct a fluid cooling medium into contact therewith while the tubes are being affixed to the holding member whereby accumulation of excess heat in the holding member is prevented, substantially as described.

4. The improvement in devices for assembling tuft tubes for tube frames embracing in combination a spacing holder provided with series of parallel transverse channels receiving a row of tuft tubes in proper relationship for the tube frame, means for retaining said tubes against displacement while they are being soldered or welded to a backing strip, and a cooling chamber extending lengthwise of the holder and in juxtaposition therewith in order to present a cooling medium to the holder to prevent expansion thereof, substantially as described.

5. The improvement in means for assembling tuft tubes for a tube frame, embracing in its construction a supporting bed provided with a series of parallel spacing members between which the individual tuft tubes are retained, a clamping plate extending across the row of inserted tuft tubes to form a co-operating holding member therewith, said bed and clamping plate being formed with stops to prevent endwise movement of the individual tubes, and a fluid-conducting conduit for supplying a fluid-cooling medium to the bed plate to prevent expansion thereof while the tuft tubes are being soldered to a backing strip, substantially as described.

6. The improvement in means for assembling tuft tubes for a tube frame, embracing in its construction co-operating members for oppositely engaging and retaining in parallel spaced relation a row of tuft tubes, means for clamping said holding members together against the interposed tuft tubes, and means for subjecting one of said members to contact with a current of a cooling fluid medium in order to prevent expansion that would disturb the spacing of the tuft tubes in relation to one another, substantially as described.

7. Means for assembling tuft tubes for a tube frame embracing in combination, a receiving and spacing member formed to provide a spacing support for a series of tuft tubes spaced therein side by side in appropriate relation to adapt them for actual use in a tube frame, means for clamping said tubes in such relation to allow the soldering of a common backing strip across their rear ends, and means for preventing expansion of the receiving and spacing member to avoid disturbance in the correct spaced relation of the tubes by the heat of soldering, substantially as described.

In witness whereof, I have subscribed the above specification.

EDGAR F. HATHAWAY.